Figure 1:
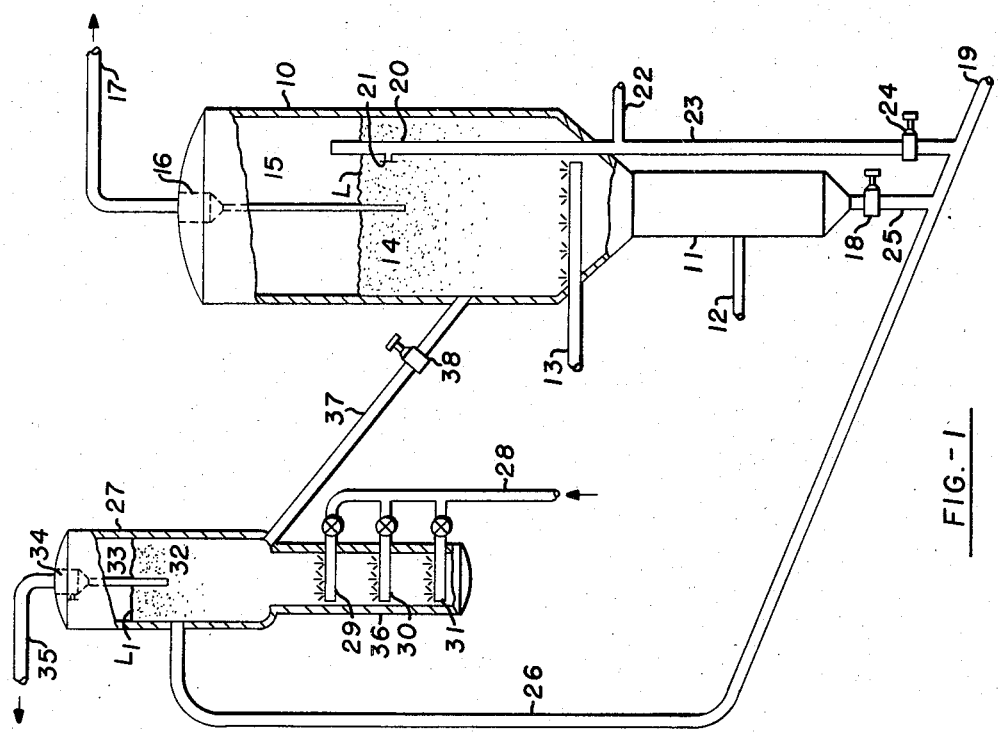

March 10, 1959  D. D. MacLAREN  2,877,175
SYSTEM FOR HANDLING COMBINED SHOT CATALYST MIXTURES
Filed Aug. 1, 1955

Donald D. MacLaren  Inventor

By H. H. Feyrer  Attorney

United States Patent Office 2,877,175
Patented Mar. 10, 1959

2,877,175

SYSTEM FOR HANDLING COMBINED SHOT CATALYST MIXTURES

Donald D. MacLaren, Scotch Plains, N. J., assignor to Esso Research and Engineering Company, a corporation of Delaware Application August 1, 1955, Serial No. 525,689

2 Claims. (Cl. 208—149)

This invention pertains to fluid catalytic processes and particularly to fluid catalytic processes in which inert heat transfer solids or shot are circulated in the system in order to facilitate the removal of heat from an exothermic reaction zone or the supply of heat to an endothermic reaction zone, or both.

The fluidized solids technique has been widely adopted for a variety of chemical reactions, especially for the conversion of hydrocarbons as in catalytic cracking, reforming, hydroforming, or the like, because of the advantages offered thereby of continuity of operation, uniformity of temperatures in the reaction and regeneration zones, and the facility with which control of all phases of the process is achieved. An important advantage of the fluidized solids technique is the fact that the catalyst can be used as a carrier of heat from the regeneration zone into the reaction zone.

It has been proposed to increase heat transfer in fluidized solids catalytic processes by circulating inert heat transfer solids through the system along with the catalyst. This is especially useful in fluid hydroforming, since selectivity considerations require that low catalyst-to-oil ratios, generally less than 3.5 to 1, be used. Such low catalyst-to-oil ratios limit the amount of heat that can be transferred from the regeneration zone to the reaction zone as sensible heat in the catalyst. Since the amount of heat released in the regenerator is greater than the catalyst can transport to the reactor at permissible temperatures, it is common practice to arrange cooling coils in the regenerator. This, therefore, makes it necessary to preheat the naphtha and recycle gas to such temperatures as tend to cause thermal degradation of naphtha feed as well as of the higher molecular weight constituents of the recycle gas. By circulating inert heat transfer solids along with the catalyst, it is possible to eliminate the cooling coils in the regenerator and also reduce the amount of recycle gas circulated and still achieve a heat balanced operation.

In view of the fact that the inert heat transfer solids, or shot, occupy valuable reactor space, i. e., each volume of shot displaces an equal volume of catalyst from the reaction zone, its size and density must be such that it will settle rapidly through the reactor. Fused mullite particles of 400–1400 micron diameter have been found to be particularly suitable. In this way the total volume of shot in the reactor at any given moment can be kept fairly low, say of the order of about one part of shot to about eight to ten parts of catalyst, while at the same time shot and catalyst are withdrawn either separately or together for circulation to the regenerator or heating zones in ratios of from about three to four parts of shot to one of catalyst to as high as eight or ten parts of shot to one of catalyst. In such systems, it is desirable to be able to vary the weight ratio of shot to catalyst in the circulating solids stream.

It is the object of this invention to provide the art with an improved method and apparatus for carrying out catalytic conversions by the fluidized solids technique employing inert heat transfer solids or shot to improve heat transfer.

It is also the object of this invention to provide the art with an improved method and apparatus whereby the weight ratio of shot to catalyst in a fluidized solids reactor system can be readily controlled.

These and other objects will appear more clearly from the detailed specification and claims which follow.

In accordance with the present invention, inert, heat transfer solids or shot such as mullite, fused alumina, or the like, or metal particles such as stainless steel or Monel are circulated with the finely divided catalyst particles in order to assist in the transfer of heat in the system. Because of the fact that the shot particles have larger diameters and are usually of higher density than the catalyst, the shot particles tend to settle through dense, fluidized beds of solids in the reactor and/or regenerator or heater vessels. By swaging down the bottom of the vessels containing such fluidized beds to form an appendage or settling zone of reduced cross sectional area as compared with the main vessel and introducing gas at controlled velocity at the lower portion of the settling zone, it is possible to withdraw a solids stream from this settling zone consisting essentially of pure shot or consisting of shot and catalyst in the desired ratio. In the event that pure shot is withdrawn from the settling zone, provision is made to withdraw catalyst from another portion of the vessel, as by arranging a catalyst withdrawal line with its inlet near the upper part of the dense fluidized bed so that catalyst may be remixed with the shot for circulation in the desired ratio.

The weight ratio of shot to catalyst in the circulating solids stream is controlled principally by the total inventory of shot in the system. Accordingly, in order to obtain substantial control of the shot-to-catalyst ratio it is essential to provide suitable means whereby the inventory of shot in the circulating system can be readily varied. It has been proposed to provide a shot reservoir at or connected to the bottom of the reactor vessel. However, if a shot reservoir is provided in the reactor vessel bottom the shot must be stripped of occluded reaction products. This necessitates either an increase in the overall vessel height because of the need of providing an external stripper, or the provision of an internal riser to an internally located stripper which requires relatively large quantities of steam or recycle gas for good circulation.

In accordance with the present invention a shot reservoir is provided at the bottom of the regenerator vessel where stripping is not necessary. This is especially advantageous in fluid hydroforming reaction systems in view of the fact that the regenerator in such systems is a relatively small vessel as compared to the reactor vessel and therefore may readily be enlarged or provided with a shot storage section or reservoir at its bottom. Multiple air injection points into the reservoir are provided in order to fluidize the shot at different levels to cause it to overflow into the regenerated catalyst withdrawal line. Alternatively, a series of orifices can be arranged in the wall of the reservoir or shot storage section connecting into the regenerated catalyst standpipe or withdrawal line with suitable inlets for air opposite each of the orifices. The orifices are so designed that when no fluidizing gas or pusher air is injected at the orifice, the angle of repose of the shot will form a seal, thus preventing shot flow into the standpipe or withdrawal line. By control of the point of injection of the air, the desired proportion of the shot in the reservoir may be fluidized and incorporated into the flowing stream of solids circulating between the reactor and regenerator.

Figure 2:
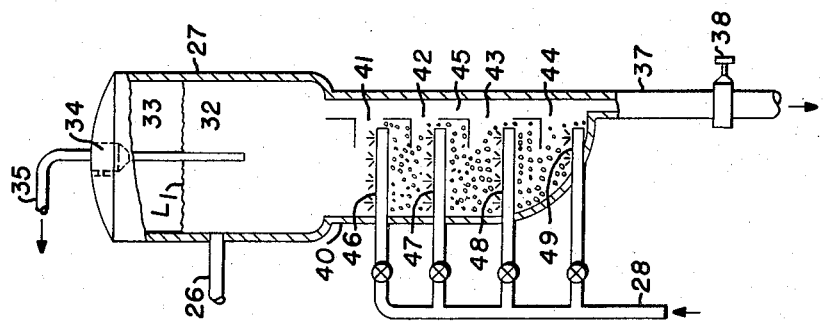

Reference is made to the accompanying drawing illustrating in Figure 1, a diagrammatic flow plan of a reactor-regenerator system in accordance with the present invention, and in Figure 2 vertical cross section of an alternate form of shot reservoir.

In Figure 1 of the drawing, the reactor vessel 10 is charged with a mixture of finely divided catalyst particles and larger particles of heat transfer solids or shot. A shot concentrating or settling zone of smaller cross sectional area 11 is arranged below the reactor vessel 10. Recycle gas is supplied to the reactor vessel through line 12, preferably in the lower part of section 11. While a single inlet line 12 is shown, it will be understood that more inlet lines may be provided as at different levels, and that suitable means for obtaining uniformity of distribution such as a distributor ring or a manifold surrounding section 11 having a multiplicity of openings into the settling zone or section 11 may also be provided. Preheated naphtha feed and, if desired, additional recycle gas are supplied to reactor 10 through inlet line 13. Gas velocities through the reactor are controlled to form a dense, fluidized bed 14 having a definite level L or interface separating it from a dilute or disperse phase 15 comprising small amounts of catalyst entrained in the vaporous reaction products in the upper part of the reactor vessel. The reaction products pass overhead from reactor vessel 10 through a cyclone separator 16 or the like for separating entrained catalyst and returning the same to the reactor dense bed 14 through the dip leg attached to the base of the cyclone. Reaction products substantially free from catalyst or other solid particles are removed through products outlet line 17 to suitable product recovery, stabilizing and/or storage equipment.

Suitable catalysts for charging to the system are metal oxides such as molybdenum oxide, chromium oxide, tungsten oxide, vanadium oxide, or the like, or mixtures thereof, preferably upon an alumina-containing support such as activated alumina, alumina gel, zinc aluminate or the like. Other hydroforming catalysts such as platinum or palladium upon alumina can also be used. The catalyst particles should, for proper fluidization, be between about 200 to 400 mesh or about 10 to 200 microns in diameter with a major proportion between about 20 and 100 microns.

The inert heat transfer solids or shot are preferably coarser and/or of greater density than the catalyst used in the process. Suitable materials include particles of metals such as stainless steel and Monel, corundum, mullite, fused alumina, fused silica, or the like. It is necessary that the heat transfer solids have no adverse effect upon the hydroforming process and that they be stable or resistant to breakdown due to the thermal and physical forces to which they are subjected in the process. The size of the heat transfer solids or shot may vary from about 200 to 2000 and are preferably about 400 to 1400 microns in diameter and also are preferably in the shape of spherical or spheroidal particles.

Because of the fact that the shot particles are larger and have a greater density than the catalyst particles they settle more rapidly than the catalyst particles to the bottom of vessel 10 and thence into the settling or concentrating section 11. The recycle gas supplied as through line 12 serves to entrain catalyst that may be carried down into section 11 by the shot and returns the catalyst to the dense bed 14. Shot, substantially free of catalyst, settles to the bottom of section 11 and is discharged through slide valve 18 or other suitable flow control means into standpipe 25 where it is transported to the regenerator by a mixture of air and catalyst. In the embodiment shown, catalyst is withdrawn separately from bed 14 by arranging a withdrawal well 20 having its upper, open end above the dense bed level L and having an opening or inlet port 21 arranged in the upper part of the dense bed 14. Stripping gas such as steam or an inert gas such as methane or nitrogen is introduced through inlet line 22 in order to strip out entrained or adsorbed vaporous reactants, which are then discharged into the dilute phase 15 in the upper part of the reactor. Stripped catalyst passes downwardly through standpipe 23 and then through slide valve, or other suitable flow control means, 24 into riser 26 where it is picked up by transporting air stream 19. Instead of withdrawing catalyst and shot separately as shown, it is also possible by control of the supply of gas to settling section 11 to withdraw from the base of section 11 a mixture of a major proportion of shot and a minor proportion of catalyst.

The slide valves 18 and 24 are set to discharge shot and catalyst into transfer line 26 in the desired ratio for circulation to regenerator 27. Air or other transport gas is introduced via line 19 to carry the mixture of shot and catalyst through riser line 26 into regenerator 27, where inactivating carbonaceous deposits are burned off, regenerating the catalyst particles and heating the catalyst and shot to regenerator temperatures. Additional air for regeneration is supplied through inlet line 28 and the distributor rings or nozzles 29, 30, and 31. The velocity of the air or regeneration gas through the regenerator vessel is at such a rate as to form a dense, fluidized bed 32 of catalyst and shot particles in regeneration gas having a definite level L'. A dilute or disperse phase comprising small amounts of entrained solid particles in regeneration gases is formed at 33 in the upper part of the regenerator vessel 27 above the dense bed level L'. The regeneration gases are withdrawn from the regenerator vessel 27 through a cyclone separator 34 or the like, and the gases, substantially free of catalyst or solid particles, pass overhead through outlet line 35 through suitable pressure relief means to a waste gas stack, a waste heat boiler, or to suitable scrubbing and storage equipment in the event that it is desired to utilize the gas for stripping or transport purposes.

The shot particles tend to settle through the dense bed 32 in regenerator 27 similarly to the way they settle in reactor 10, and by controlling the amount of air introduced via line 28 and distributors 29, 30, and 31, the shot can be concentrated or collected in shot storage reservoir 36 at the bottom of the regenerator vessel 27. This reservoir is sufficiently large to hold the entire shot or heat transfer solid inventory of the reactor system. By supplying air via line 28 and distributor 29, minimum amounts of shot can be fluidized from reservoir 36 and mixed with the catalyst in dense bed 32 for transfer to the reaction zone. By shifting the level of introduction of the air to distributor 30, a larger amount and to distributor 31 the maximum or total inventory of shot may be mixed with the catalyst. The hot regenerated catalyst and shot mixture is withdrawn from the bottom of the regenerator through line 37 and discharged at a rate controlled by slide valve 38 back into the reactor vessel 10. If desired, stripping gas may be supplied to conduit 37 in order to remove residual or entrained regeneration gases. Moreover, in the case of hydroforming catalysts of the group VI metal oxide type, the regenerated catalyst in transfer line 37 may be treated, if desired, with a reducing gas such as hydrogen or hydrogen-rich recycle gas, or it may be discharged into reactor 10 without contact with hydrogen or other reducing gas.

Figure 2 shows an alternate form of regenerator and shot reservoir. In Figure 2 the corresponding parts carry the same reference numerals as in Figure 1, the regenerator vessel, the inlet for catalyst and shot and outlet for regeneration gases being identical to those of Figure 1. In Figure 2 the reservoir comprises a vessel 40 arranged below the regenerator vessel 27 of sufficient size to hold the entire shot inventory of the system. The vessel is provided with a plurality or series of orifices 41, 42, 43, and 44 opening into overflow well 45, which is connected to the regenerated catalyst standpipe or transfer line 37. A plurality of outlets for air or fluidizing gas 46, 47, 48 and 49 are provided at the level of each of these orifices. The orifices are so designed that when no fluidizing gas or pusher air is injected at the orifice, the angle of repose of the shot will form a seal, thus preventing shot flow into the overflow well, and thence into the standpipe. When it is desired to add shot to this system, air is injected into the topmost inlet 46, thereby fluidizing the shot thereabove, permitting it to flow through orifice 41 into the overflow well 45 and thence into the circulating stream of catalyst. Increasing the amount of air at this point will result in increasing shot inventory in the circulating system by an amount equal to the shot held in the reservoir above the activated inlet and thus cause an incremental increase in the shot-to-catalyst ratio. When it is desired further to increase the amount of shot in the system and thereby the shot-to-catalyst ratio, the air is switched to a lower zone which is similarly fluidized, adding this amount of shot to the overflow well 45. As shown in Figure 2, air is being added through inlet 47 while orifices 43 and 44 are closed by the static bed of shot.

The feed or charging stock to the reactor in a hydroforming operation may be a virgin, cracked (thermal or catalytic) or Fischer-Tropsch naphtha, or the like, or mixtures of two or more of these naphthas, having a boiling range of from about 125°–450° F., or it may be a narrow boiling cut from within this range. The feed stock is preheated to about reaction temperature and supplied to the reaction zone. Recycle gas is preheated to temperatures of up to about 1200° F. and introduced or circulated through the reaction zone at rates of from about 500 to 6000 cubic feet per barrel of feed.

The hydroformer reactor vessel is operated at about 850°–1050° F., preferably about 900°–950° F., and at pressures of about 50–1000, preferably about 200 pounds per square inch. In the case of molybdenum oxide on alumina catalysts it is desirable to maintain a water partial pressure of about 0.1 to 3.0 mol percent in the reaction zone.

The regenerator is operated at essentially the same pressure as the hydroformer reactor vessel and at temperatures of about 1000–1200° F. or low enough to avoid thermal degradation of the catalyst. The average residence time of the catalyst in the reactor vessel is of the order of from about 1 to 4 hours and in the regenerator vessel of from about 3 to 60 minutes. The average residence time of the heat transfer solids in the reaction zone is of the order of about 3 to 20 minutes, and in the regeneration zone the residence time of the heat transfer solids may be coextensive with the residence time of the catalyst, or said solids may be held for longer or shorter times than the catalyst.

The weight ratio of catalyst to oil inroduced into the reactor should ordinarily be about 0.5 to 3.5. Space velocities, or the weight in pounds of feed charged per hour per pound of catalyst in the reactor, depend upon the age or activity level of the catalyst, the character of the feed stock, and the desired octane number of the product. Space velocity for a molybdic oxide on alumina gel catalyst may vary from about 1.5 to about 0.15 w./hr./w.

A typical operation in accord with the present invention is as follows. A 250/325° F. West Texas virgin naphtha is hydroformed to 92 research octane clear. Reactor temperature is 900° F., space velocity 0.78 pound of oil per hour per pound of catalyst in the reactor. Approximately 800 s. c. f./bbl. of recycle gas are added to the shot stripping zone at the reactor bottom to separate a pure shot stream. The remaining recycle gas, totaling 2000 s. c. f./bbl., and feed are heated together to 1000° F. and fed via a distributor to the reactor bottom. Catalyst is circulated at a catalyst to oil ratio of 0.72; shot is circulated at shot to oil ratio of 2.5 or a shot to catalyst ratio of about 3.5. Regenerator temperature is maintained at 1125° F. Catalyst holding time in the generator is about 5 minutes with 0.5–1 vol. percent oxygen in the flue gas. Under these conditions heat balance operation is attained; that is, all heat released in the regenerator is carried to the reactor by the circulating shot-catalyst stream.

When it is desired to change operating conditions which require an increase in the amount of shot circulated, one or more of the regenerator storage zone aeration taps are employed to add the shot. The quantity of air required in said zone is a function of shot particle size. For this case where a 400 micron shot is used, an aeration velocity of about 0.3 feet/second is sufficient. Increasing shot size will require higher velocities. Since it is desirable to maintain the amount of air in the regenerator constant, main regenerator aeration is reduced by the amount fed to the storage zone.

The foregoing description contains a limited number of embodiments of this invention. It will be understood that this invention is not limited thereto, since numerous variations are possible without departing from the scope of this invention.

What is claimed is:

1. In a method of converting hydrocarbons in contact with a mixture of a major proportion of finely divided catalyst particles and a minor proportion of inert heat transfer solids or shot in a dense, fluidized bed, and in which catalyst and shot are continuously withdrawn from the reaction zone, circulated to a regeneration zone where carbonaceous deposits are burned off and the catalyst and shot are heated for return to the reaction zone, the improvement which comprises circulating shot from the reactor to the regenerator and back to the reactor at a faster rate than the catalyst, maintaining a relatively quiescent body of shot particles in a storage zone at the bottom of the regeneration zone which shot particles seal off openings at different levels in said storage zone for the withdrawal of shot from said storage zone, and controlling the inventory of shot in the reactor-regenerator circulating system by varying the point of introduction of the air into this regenerator bottom storage zone, said air being introduced in such a manner as to fluidize the shot particles adjacent at least one of said openings.

2. In a reactor-regenerator system in which finely divided catalyst particles and inert heat transfer solids are continuously circulated between a reaction zone and a regeneration zone wherein carbonaceous deposits are burned off of the catalyst particles the improvement which comprises providing a shot storage zone at the bottom of the regenerator vessel, said shot storage zone being of smaller cross-sectional area than the regenerator vessel, providing a withdrawal well at the bottom of said regenerator vessel for the withdrawal of catalyst and heat transfer solids for recycling to the reaction zone, extending said withdrawal well downwardly contiguous to said shot storage zone, providing a plurality of vertically spaced openings in the wall separating the shot storage zone from said withdrawal line, providing a shield above each of said openings extending a sufficient distance into said shot storage zone that the angle of repose of quiescent shot beneath said shield will seal off said openings and providing inlet means for the introduction of fluidizing gas adjacent each of said openings.

References Cited in the file of this patent

UNITED STATES PATENTS

| | | |
|---|---|---|
| 2,446,247 | Scheineman | Aug. 3, 1948 |
| 2,586,818 | Harms | Feb. 26, 1952 |